United States Patent
Wiacek

(10) Patent No.: US 12,450,349 B2
(45) Date of Patent: Oct. 21, 2025

(54) EVALUATING FILES FOR MALICIOUS AND/OR SUSPICIOUS CODE

(71) Applicant: Stairwell, Inc., Santa Clara, CA (US)

(72) Inventor: Michael Joseph Wiacek, Santa Clara, CA (US)

(73) Assignee: Stairwell, Inc., Mountain View, CA (US)

( * ) Notice: Subject to any disclaimer, the term of this patent is extended or adjusted under 35 U.S.C. 154(b) by 194 days.

(21) Appl. No.: 17/958,269

(22) Filed: Sep. 30, 2022

(65) Prior Publication Data

US 2023/0103536 A1    Apr. 6, 2023

Related U.S. Application Data

(60) Provisional application No. 63/251,542, filed on Oct. 1, 2021.

(51) Int. Cl.
*G06F 21/56* (2013.01)

(52) U.S. Cl.
CPC ...... *G06F 21/565* (2013.01); *G06F 2221/033* (2013.01)

(58) Field of Classification Search
CPC ...... G06F 21/566; G06F 21/565; G06F 17/18; G06F 21/56; G06F 21/561; G06F 21/563; H04L 63/1416; H04L 43/16
See application file for complete search history.

(56) References Cited

U.S. PATENT DOCUMENTS

| | | |
|---|---|---|
| 8,225,405 B1 | 7/2012 | Peterson et al. |
| 11,841,947 B1* | 12/2023 | Saxe ............... G06N 3/045 |
| 2006/0230289 A1 | 10/2006 | Fox et al. |
| 2016/0019392 A1 | 1/2016 | Singh et al. |
| 2016/0119366 A1 | 4/2016 | Alme |
| 2019/0121978 A1* | 4/2019 | Kraemer ............ G06F 21/565 |
| 2021/0097177 A1 | 4/2021 | Chistyakov et al. |

OTHER PUBLICATIONS

USPTO—International Search Report and Written Opinion mailed on Jan. 31, 2023 for related International Appl. No. PCT/US2022/045448, 10 pgs.

* cited by examiner

*Primary Examiner* — Olugbenga O Idowu
(74) *Attorney, Agent, or Firm* — McDermott Will & Schulte LLP

(57) ABSTRACT

Methods, systems, and storage media for evaluating uploaded files for suspicious code are provided. The method includes to receive a copy of one file from a customer of a software provider, evaluate the copy of the file to determine a likelihood that the copy of the file contains malicious code, generate a report, provide the report to the customer, store the copy of the file and the report in a data store, iteratively evaluate the copy of the file to determine the likelihood that the copy of the file contains malicious code, on at least a portion of the iterations, compare the likelihood that the copy of the file contains malicious code to the stored report to determine whether there has been a change in the likelihood, upon determining that there has been a change in the likelihood, generate and provide a second report.

20 Claims, 5 Drawing Sheets

EVALUATING FILES FOR MALICIOUS AND/OR SUSPICIOUS CODE

CROSS-REFERENCE TO RELATED APPLICATIONS

The present disclosure is related and claims priority under 35 USC § 119(e) to U.S. Prov. Appln. No. 63/251,542, entitled EVALUATING FILES FOR MALICIOUS AND/OR SUSPICIOUS CODE, filed on Oct. 1, 2021, to Michael Joseph WIACEK, the contents of which are hereby incorporated by reference in their entirety, for all purposes.

TECHNICAL FIELD

The present disclosure generally relates to evaluating electronic file security. More particularly, the present disclosure relates to evaluating files to identify malicious and/or suspicious code as a drop-in service.

BACKGROUND

Organizations that accept file uploads to their platforms (e.g., file hosting services) run the risk of accepting files containing malicious and/or suspicious code (e.g., Trojans, viruses, etc.). As users of the platforms share files amongst one another, the risk of propagating a malware-infected file only makes the issue more pressing. As such, such organizations typically create a file security evaluation system to protect themselves, and their customers, from this threat. As there are numerous such platforms in the marketplace, such efforts are repeatedly undertaken by numerous organizations resulting in inefficiencies.

BRIEF SUMMARY

The subject disclosure provides for systems and methods for evaluating files and/or copies of files to determine a likelihood that that files and or file copies contain malicious and/or suspicious code. One or more files (and/or file copies) may be received and evaluated to determine a likelihood that the file(s)/file copy(ies) contain malicious and/or suspicious code. In aspects, file(s)/file copy(ies) may be received from a customer of a security-threat-identifying software-as-a-service ("SaaS") provider as a drop-in service and/or from a user of the customer. A report may be generated that contains the determined likelihood. The report may be provided to the customer, the user of the customer, and/or stored in a data store. Stored file copies and reports may be utilized to iteratively evaluate files/file copies as more information is added to the data store and, upon determining a change in the likelihood that a file and/or file copy contains malicious and/or suspicious code, a second report provided and/or stored. In this way, customers may rely on a SaaS provider to evaluate files/file copies for potential security threats without having to individually create and maintain their own security evaluation systems.

One aspect of the present disclosure relates to a computer-implemented method for evaluating files to determine a likelihood that one or more of the files contains malicious and/or suspicious code and, as such, poses at least a potential security threat. The method may include receiving a copy of at least one file from a customer of a software and/or data provider. The method may include evaluating the copy of the at least one file to determine a likelihood that the copy of the at least one file contains malicious and/or suspicious code. The method may include generating a report containing the determined likelihood that the at least one file contains malicious and/or suspicious code. The method may include providing the generated report to the customer of the software and/or data provider. The method may include storing the copy of the at least one file and the generated report in a data store. The method may include iteratively evaluating the copy of the at least one file to determine the likelihood that the copy of the at least one file contains malicious and/or suspicious code. The method may include, on at least a portion of the iterations, comparing the determined likelihood that the copy of the at least one file contains malicious and/or suspicious code to the stored report to determine whether there has been a change in the likelihood that the copy of the at least one file contains malicious and/or suspicious code. The method may include, upon identifying that there has been a change in the likelihood that the copy of the at least one file contains suspicious and/or malicious code, generating a second report containing the changed likelihood that the copy of the at least one file contains malicious and/or suspicious code. The method may include providing the generated second report to the customer of the software and/or data provider.

Another aspect of the present disclosure relates to a system configured for evaluating files to determine a likelihood that one or more of the files contains malicious and/or suspicious code and, as such, poses at least a potential security threat. The system may include one or more hardware processors configured by machine-readable instructions. The processor(s) may be configured to receive a copy of at least one file from a user of a customer of a software and/or data provider. The processor(s) may be configured to evaluate the copy of the at least one file to determine a likelihood that the copy of the at least one file contains malicious and/or suspicious code. The processor(s) may be configured to generate a report containing the determined likelihood that the at least one file contains malicious and/or suspicious code. The processor(s) may be configured to determine whether the likelihood that the copy of the at least one file contains malicious and/or suspicious code meets or exceeds a threshold likelihood. If it is determined that the likelihood that the copy of the at least one file contains malicious and/or suspicious code meets or exceeds a threshold likelihood, the processor(s) may be configured to provide the generated report to the at least one of the user of the software and/or data provider. If it is determined that the threshold likelihood that the copy of the at least one file contains malicious and/or suspicious code has not been met or exceeded, the processor(s) may be configured to store the copy of the at least one file and the generated report in a data store.

The processor(s) may be configured to iteratively evaluate the stored copy of the at least one file to determine the likelihood that the copy of the at least one file contains malicious and/or suspicious code. The processor(s) may be configured to, on at least a portion of the iterations, compare the determined likelihood that the copy of the at least one file contains malicious and/or suspicious code to the stored report to determine whether there has been a change in the likelihood that the copy of the at least one file contains suspicious and/or malicious code. Upon determining that there has been a change in the likelihood that the copy of the at least one file contains malicious and/or suspicious code, the processor(s) may be configured to generate a second report containing the changed likelihood that the copy of the at least one file contains malicious and/or suspicious code. The processor(s) may be configured to determine whether the changed likelihood that the copy of the at least one file contains malicious and/or suspicious code meets or exceeds the threshold likelihood. If it is determined that the changed likelihood that the copy of the at least one file contains malicious and/or suspicious code meets or exceeds the threshold likelihood, the processor(s) may be configured to provide the generated second report to the user of the software and/or data provider.

Yet another aspect of the present disclosure relates to a non-transient computer-readable storage medium having instructions embodied thereon, the instructions being executable by one or more processors to perform a method for evaluating files to determine a likelihood that one or more of the files contains malicious and/or suspicious code and, as such, poses at least a potential security threat. The method may include receiving a copy of at least one file from a customer of a software and/or data provider. The method may include evaluating the copy of the at least one file to determine a likelihood that the copy of the at least one file contains malicious and/or suspicious code. The method may include generating a report containing the determined likelihood that the at least one file contains malicious and/or suspicious code. The method may include providing the generated report to the customer of the software and/or data provider. The method may include storing the copy of the at least one file and the generated report in a data store. The method may include iteratively evaluating the copy of the at least one file to determine the likelihood that the copy of the at least one file contains malicious and/or suspicious code. The method may include, on at least a portion of the iterations, comparing the determined likelihood that the copy of the at least one file contains malicious and/or suspicious code to the stored report to determine whether there has been a change in the likelihood that the copy of the at least one file contains suspicious and/or malicious code. The method may include, upon identifying that there has been a change in the likelihood that the copy of the at least one file contains suspicious and/or malicious code, generating a second report containing the changed likelihood that the copy of the at least one file contains suspicious and/or malicious code. The method may include providing the generated second report to the customer of the software and/or data provider.

Still another aspect of the present disclosure relates to a system configured for evaluating files to determine a likelihood that one or more of the files contains malicious and/or suspicious code and, as such, poses at least a potential security threat. The system may include means for receiving a copy of at least one file from a user of a customer of a software and/or data provider. The system may include means for evaluating the copy of the at least one file to determine a likelihood that the copy of the at least one file contains malicious and/or suspicious code. The system may include means for generating a report containing the determined likelihood that the at least one file contains malicious and/or suspicious code. The system may include means for determining whether the determined likelihood that the copy of the at least one file contains malicious and/or suspicious code meets or exceeds a threshold likelihood. If it is determined that the likelihood that the copy of the at least one file contains malicious and/or suspicious code meets or exceeds a threshold likelihood, the system may include means for providing the generated report to at least one of the customer of the software and/or data provider. If it is determined that the threshold likelihood that the copy of the at least one file contains malicious and/or suspicious code has not been met or exceeded, the system may include means for storing the copy of the at least one file and the generated report in a data store.

The system may include means for iteratively evaluating the stored copy of the at least one file to determine the likelihood that the copy of the at least one file contains malicious and/or suspicious code. The system may include, on at least a portion of the iterations, means for comparing the determined likelihood that the copy of the at least one file contains malicious and/or suspicious code to the stored report to determine whether there has been a change in the likelihood that the copy of the at least one file contains malicious and/or suspicious code. Upon determining that there has been a change in the likelihood that the copy of the at least one file contains malicious and/or suspicious code, the system may include means for generating a second report containing the changed likelihood that the copy of the at least one file contains malicious and/or suspicious code. The system may include means for determining whether the changed likelihood that the copy of the at least one file contains malicious and/or suspicious code meets or exceeds the threshold likelihood. If it is determined that the changed likelihood that the copy of the at least one file contains malicious and/or suspicious code meets or exceeds the threshold likelihood, the system may include means for providing the generated second report to a customer of a software and/or data provider.

BRIEF DESCRIPTION OF THE SEVERAL VIEWS OF THE DRAWINGS

To easily identify the discussion of any particular element or act, the most significant digit or digits in a reference number refer to the figure number in which that element is first introduced.

In one or more implementations, not all of the depicted components in each figure may be required, and one or more implementations may include additional components not shown in a figure. Variations in the arrangement and type of the components may be made without departing from the scope of the subject disclosure. Additional components, different components, or fewer components may be utilized within the scope of the subject disclosure.

DETAILED DESCRIPTION

In the following detailed description, numerous specific details are set forth to provide a full understanding of the present disclosure. It will be apparent, however, to one ordinarily skilled in the art, that the embodiments of the present disclosure may be practiced without some of these specific details. In other instances, well-known structures and techniques have not been shown in detail so as not to obscure the disclosure.

Organizations that accept file uploads to their platforms (e.g., file hosting services) run the risk of accepting files containing malicious and/or suspicious code (e.g., Trojans, viruses, etc.). As users of the platforms share files amongst one another, the risk of propagating a malware-infected file only makes the issue more pressing. As such, such organizations typically create a file security evaluation system to protect themselves, and their customers, from this threat. As there are numerous such platforms in the marketplace, such efforts are repeatedly undertaken by numerous organizations resulting in inefficiencies.

The subject disclosure provides for systems and methods for evaluating files and/or copies of files to determine a likelihood that that files and or file copies contain malicious and/or suspicious code. One or more files (and/or file copies) may be received and evaluated to determine a likelihood that the file(s)/file copy(ies) contain malicious and/or suspicious code. In aspects, file(s)/file copy(ies) may be received from a customer of a security-threat-identifying software-as-a-service ("SaaS") provider as a drop-in service and/or from a user of the customer. A report may be generated that contains the determined likelihood. The report may be provided to the customer, the user of the customer, and/or stored in a data store. Stored file copies and reports may be utilized to iteratively evaluate files/file copies as more information is added to the data store and, upon determining a change in the likelihood that a file and/or file copy contains malicious and/or suspicious code, a second report provided and/or stored. In this way, customers may rely on a SaaS provider to evaluate files/file copies for potential security threats without having to individually create and maintain their own security evaluation systems.

Figure 1:
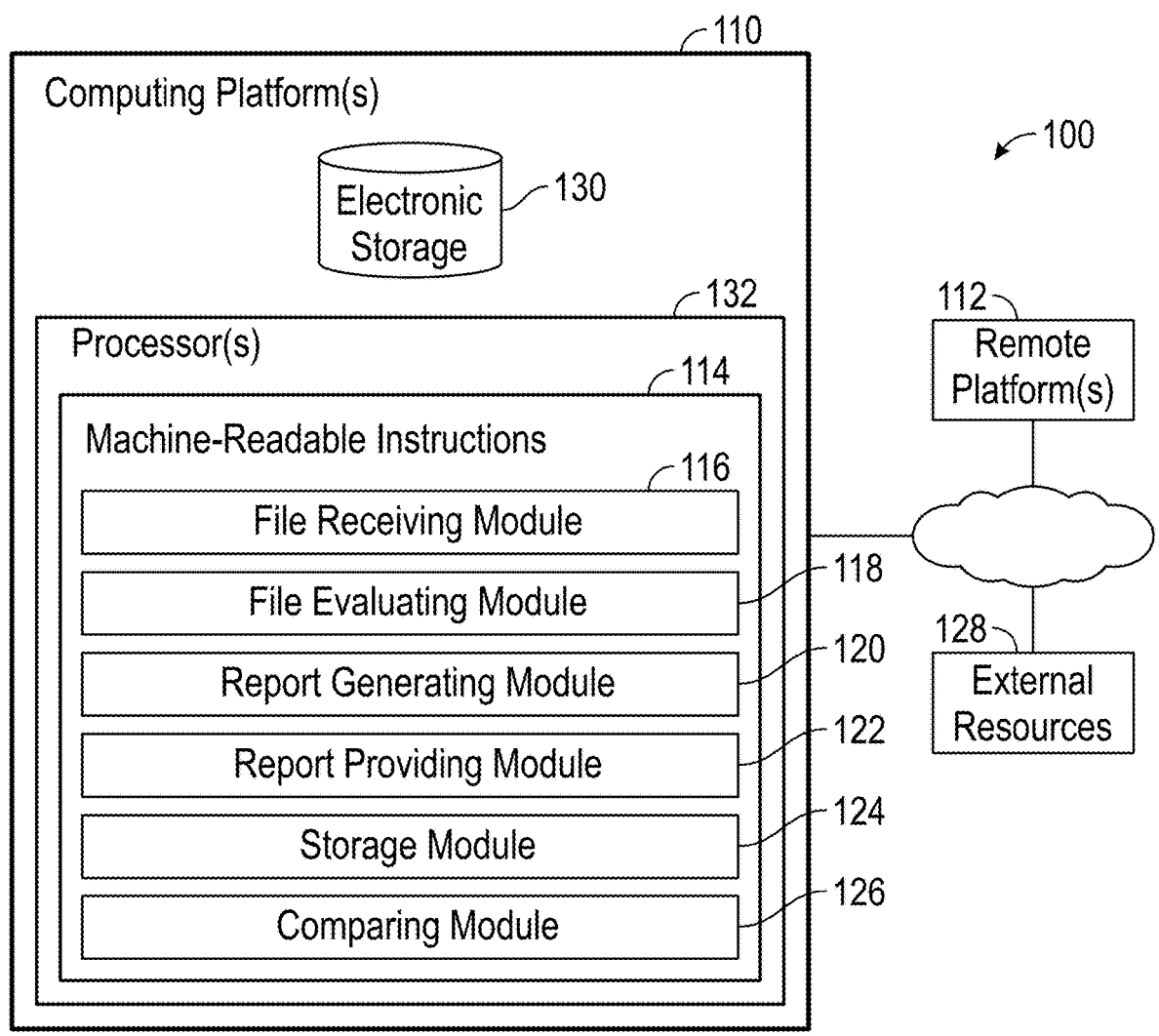
FIG. 1 illustrates a system configured for evaluating files to determine a likelihood that one or more of the files contains malicious and/or suspicious code, in accordance with one or more implementations of the present disclosure.

FIG. 1 illustrates a system 1100 configured to evaluating files to determine a likelihood that one or more of the files contains malicious and/or suspicious code and, as such, poses at least a potential security threat, according to certain aspects of the present disclosure. In some implementations, system 100 may include one or more computing platforms 110. Computing platform(s) 110 may be configured to communicate with one or more remote platforms 112 according to a client/server architecture, a peer-to-peer architecture, and/or other architectures. Remote platform(s) 112 may be configured to communicate with other remote platforms via computing platform(s) 110 and/or according to a client/server architecture, a peer-to-peer architecture, and/or other architectures. Users may access system 100 via remote platform(s) 112.

Computing platform(s) 110 may be configured by machine-readable instructions 114. Machine-readable instructions 114 may include one or more instruction modules. The instruction modules may include computer program modules. The instruction modules may include one or more of file receiving module 116, file evaluating module 118, report generating module 120, report providing module 122, storage module 124, comparing module 126, and/or other instruction modules.

File receiving module 116 may be configured to receive a copy of at least one file from a customer of a security-threat-identifying SaaS provider. In aspects, the at least one file may be an attachment to a communication of an online communications provider. In aspects, the copy of the at least one file may be received by the file receiving module 116 via a secured file upload procedure. In aspects, the customer of the security-threat-identifying SaaS provider may quarantine the file(s) until a report of at least a minimal threat is received from the SaaS provider.

File receiving module 116 further may be configured to receive at least one file from a user of a customer of a security-threat-identifying SaaS provider. In aspects, the at least one file may be an attachment to a communication of an online communications provider. In aspects, the at least one file may be received by the file receiving module 116 via a secured file upload procedure. In aspects, the security-threat-identifying SaaS provider may quarantine the file(s) until a determination of at least a minimal threat is made.

File evaluating module 118 may be configured evaluate a copy of at least one file to determine a likelihood that the copy of the at least one file contains malicious and/or suspicious code. In aspects, the file evaluating module 118 may be configured to evaluate at least one file to determine a likelihood that the at least one file contains malicious and/or suspicious code. In aspects, the copy of the at least one file and/or the at least one file may be evaluated using YARA rules. YARA is an open-source computing language that provides a way of identifying malware (or other files) by creating rules that look for certain characteristics. Utilizing YARA, a user basically writes a sort of recipe or rule and evaluates suspicious files (or any files) against it to determine if the file matches the rule. Files matching rules then may be considered malicious (or at least suspicious). As more files are added to the data store, and/or more YARA rules, various connections and patterns may be identified permitting associations with files containing at least potentially malicious and/or suspicious code to be identified. In some embodiments of the present disclosure, third party data sources may be added to enhance the information present in the data store.

The file evaluating module 118 further may be configured to determine whether or not the determined likelihood that the copy of the at least one file contains malicious and/or suspicious code meets or exceeds a threshold likelihood.

Report generating module 120 may be configured to generate a report containing the determined likelihood that the at least one file contains malicious and/or suspicious code. If it is determined (e.g., by the file evaluating module 118) that the likelihood that the copy of the at least one file and/or the at least one file contains malicious and/or suspicious code meets or exceeds the threshold likelihood, the report providing module 122 may be configured to provide the generated report to the at least one of the user of the customer of the security-threat-identifying SaaS provider and the customer of the security-threat-identifying SaaS provider. In aspects, providing the generated second report to at least one of the user of the customer of the security-threat-identifying SaaS provider and the customer of the security-threat-identifying SaaS provider may include causing the generated report to display in association with a computing device of the customer of the security-threat-identifying SaaS provider and/or the user of the customer of the security-threat-identifying SaaS provider.

Report providing module 122 may be configured to provide the generated report to the customer of the security-threat-identifying SaaS provider and/or the user or the customer of the security-threat-identifying SaaS provider. In aspects, providing the generated second report to at least one of the user of the customer of the security-threat-identifying SaaS provider and the customer of the security-threat-identifying SaaS provider may include causing the generated report to display in association with a computing device of the customer of the security-threat-identifying SaaS provider and/or the user of the customer of the security-threat-identifying SaaS provider.

Storage module 124 may be configured to store the copy of the at least one file and the generated report in a data store.

Comparing module 126 may be configured to compare the determined likelihood that a copy of the at least one file and/or at least one file contains malicious and/or suspicious code to a stored report to determine whether there has been a change in the likelihood that the copy of the at least one file contains malicious and/or suspicious code.

In some implementations, computing platform(s) 110, remote platform(s) 112, and/or external resources 128 may be operatively linked via one or more electronic communication links. For example, such electronic communication links may be established, at least in part, via a network such as the Internet and/or other networks. It will be appreciated that this is not intended to be limiting, and that the scope of this disclosure includes implementations in which computing platform(s) 110, remote platform(s) 112, and/or external resources 128 may be operatively linked via some other communication media.

A given remote platform 112 may include one or more processors configured to execute computer program modules. The computer program modules may be configured to enable an expert or user associated with the given remote platform 112 to interface with system 100 and/or external resources 128, and/or provide other functionality attributed herein to remote platform(s) 112. By way of non-limiting example, a given remote platform 112 and/or a given computing platform 110 may include one or more of a server, a desktop computer, a laptop computer, a handheld computer, a tablet computing platform, a NetBook, a Smartphone, a gaming console, and/or other computing platforms.

External resources 128 may include sources of information outside of system 100, external entities participating with system 100, and/or other resources. In some implementations, some or all of the functionality attributed herein to external resources 128 may be provided by resources included in system 100.

Computing platform(s) 110 may include electronic storage 130, one or more processors 132, and/or other components. Computing platform(s) 110 may include communication lines, or ports to enable the exchange of information with a network and/or other computing platforms. Illustration of computing platform(s) 110 in FIG. 1 is not intended to be limiting. Computing platform(s) 110 may include a plurality of hardware, software, and/or firmware components operating together to provide the functionality attributed herein to computing platform(s) 110. For example, computing platform(s) 110 may be implemented by a cloud of computing platforms operating together as computing platform(s) 110.

Electronic storage 130 may comprise non-transitory storage media that electronically stores information. The electronic storage media of electronic storage 130 may include one or both of system storage that is provided integrally (i.e., substantially non-removable) with computing platform(s) 110 and/or removable storage that is removably connectable to computing platform(s) 110 via, for example, a port (e.g., a USB port, a firewire port, etc.) or a drive (e.g., a disk drive, etc.). Electronic storage 130 may include one or more of optically readable storage media (e.g., optical disks, etc.), magnetically readable storage media (e.g., magnetic tape, magnetic hard drive, floppy drive, etc.), electrical charge-based storage media (e.g., EEPROM, RAM, etc.), solid-state storage media (e.g., flash drive, etc.), and/or other electronically readable storage media. Electronic storage 130 may include one or more virtual storage resources (e.g., cloud storage, a virtual private network, and/or other virtual storage resources). Electronic storage 130 may store software algorithms, information determined by processor(s) 132, information received from computing platform(s) 110, information received from remote platform(s) 112, and/or other information that enables computing platform(s) 110 to function as described herein.

Processor(s) 132 may be configured to provide information processing capabilities in computing platform(s) 110. As such, processor(s) 132 may include one or more of a digital processor, an analog processor, a digital circuit designed to process information, an analog circuit designed to process information, a state machine, and/or other mechanisms for electronically processing information. Although processor(s) 132 is shown in FIG. 1 as a single entity, this is for illustrative purposes only. In some implementations, processor(s) 1126 may include a plurality of processing units. These processing units may be physically located within the same device, or processor(s) 132 may represent processing functionality of a plurality of devices operating in coordination. Processor(s) 132 may be configured to execute modules 116, 118, 120, 122, 124, 126, and/or other modules. Processor(s) 132 may be configured to execute modules 116, 118, 120, 122, 124, and/or 126, and/or other modules by software; hardware; firmware; some combination of software, hardware, and/or firmware; and/or other mechanisms for configuring processing capabilities on processor(s) 132. As used herein, the term "module" may refer to any component or set of components that perform the functionality attributed to the module. This may include one or more physical processors during execution of processor readable instructions, the processor readable instructions, circuitry, hardware, storage media, or any other components.

It should be appreciated that although modules 116, 118, 120, 122, 124, and/or 126, are illustrated in FIG. 1 as being implemented within a single processing unit, in implementations in which processor(s) 132 includes multiple processing units, one or more of modules 116, 118, 120, 122, 124, and/or 126 may be implemented remotely from the other modules. The description of the functionality provided by the different modules 116, 118, 120, 122, 124, and/or 126 described below is for illustrative purposes, and is not intended to be limiting, as any of modules 116, 118, 120, 122, 124, and/or 126 may provide more or less functionality than is described. For example, one or more of modules 116, 118, 120, 122, 124, and/or 126 may be eliminated, and some or all of its functionality may be provided by other ones of modules 116, 118, 120, 122, 124, and/or 126. As another example, processor(s) 132 may be configured to execute one or more additional modules that may perform some or all of the functionality attributed below to one of modules 116, 118, 120, 122, 124, and/or 126.

The techniques described herein may be implemented as method(s) that are performed by physical computing device(s); as one or more non-transitory computer-readable storage media storing instructions which, when executed by computing device(s), cause performance of the method(s); or, as physical computing device(s) that are specially configured with a combination of hardware and software that causes performance of the method(s).

Figure 2:
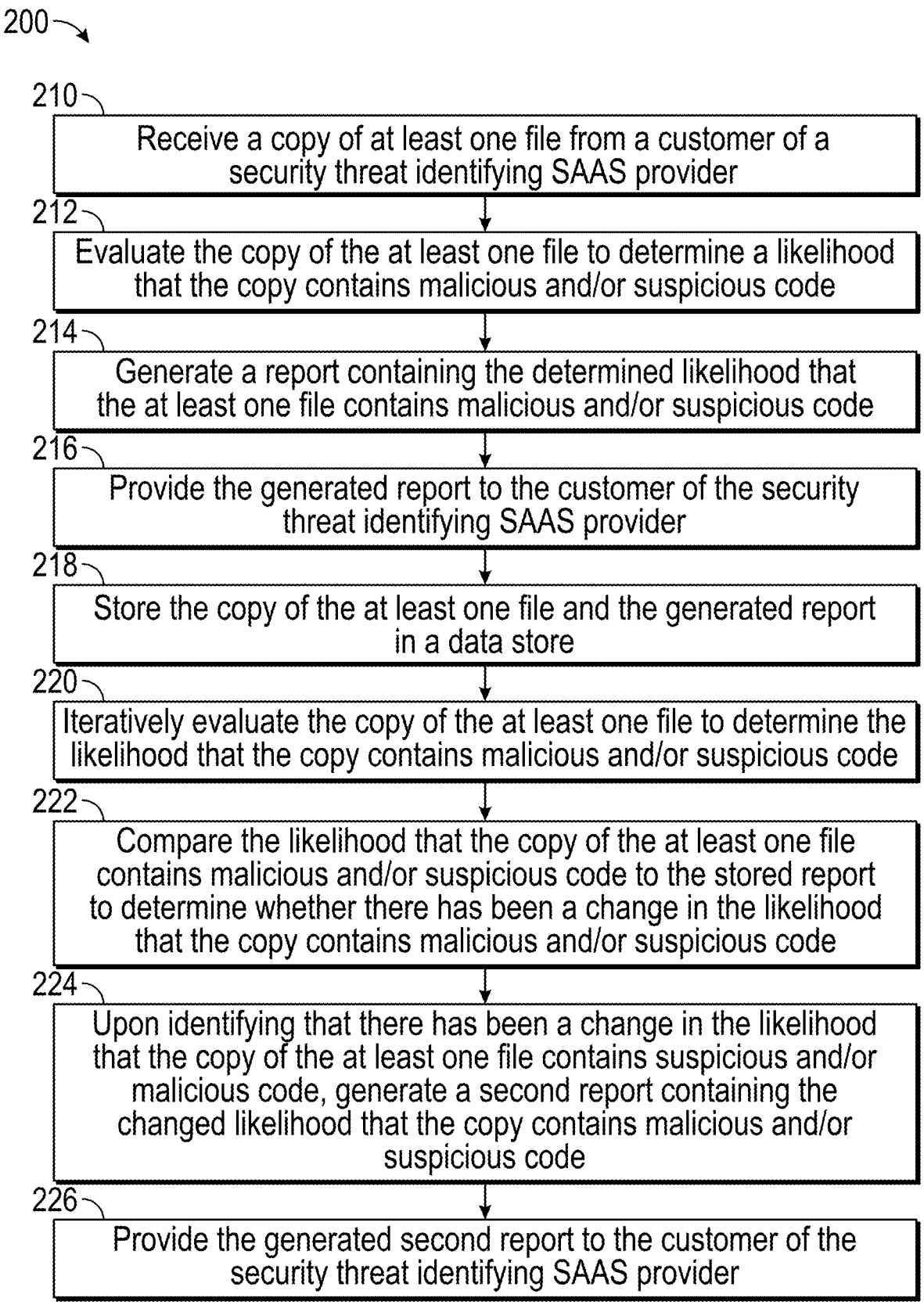
FIG. 2 illustrates an exemplary flow diagram for evaluating files to determine a likelihood that one or more of the files contains malicious and/or suspicious code, in accordance with one or more implementations of the present disclosure.

FIG. 2 illustrates an exemplary flow diagram (e.g., process 200) for evaluating files to determine a likelihood that one or more of the files contains malicious and/or suspicious code and, as such, poses at least a potential security threat, according to certain aspects of the disclosure. For explanatory purposes, the exemplary process 200 is described herein with reference to FIG. 1. Further for explanatory purposes, the steps of the exemplary process 200 are described herein as occurring in serial, or linearly. However, multiple instances of the example process 200 may occur in parallel.

At step 210, the process 200 may include receiving (e.g., through the file receiving module 116 of the system 100 of FIG. 1) a copy of at least one file from a customer of a software and/or data provider (e.g., a security-threat-identifying SaaS provider).

At step 212, the process 200 may include evaluating (e.g., through the file evaluating module 118 of the system 100 of FIG. 1) the copy of the at least one file to determine a likelihood that the copy of the at least one file contains malicious and/or suspicious code. In some embodiments, step 212 includes matching the copy of the file with a known sequence found in a computer virus. In some embodiments, step 212 includes accessing a library including a known malicious code and determining a similarity between the copy of the file and the known malicious code. In some embodiments, step 212 includes matching the copy of the file with at least one rule in the security-threat-identifying service provider that has been successfully used to identify a confirmed malicious code. In some embodiments, step 212 includes identifying a pattern from a confirmed malicious code in the copy of the file. In some embodiments, step 212 includes correlating the copy of the file with a content of one or more confirmed malicious codes. In some embodiments, step 212 includes updating a rule in the security-threat-identifying service provider when the file is confirmed to include a malicious code.

At step 214, the process 200 may include generating (e.g., through the report generating module 120 of the system 100 of FIG. 1) a report containing the determined likelihood that the at least one file contains malicious and/or suspicious code.

At step 216, the process 200 may include providing (e.g., through the report providing module 122 of the system 100 of FIG. 1) the generated report to the customer of the software and/or data provider (e.g., a security-threat-identifying SaaS provider). In aspects, providing the generated report to the customer of the security-threat-identifying SaaS provider may include causing the generated report to display in association with a computing device of the customer of the security-threat-identifying SaaS provider.

At step 218, the process 200 may include storing (e.g., through the storage module 124 of the system 100 of FIG. 1) the copy of the at least one file and the generated report in a data store.

At step 220, the process 200 may include iteratively evaluating (e.g., through the file evaluating module 118 of the system 100 of FIG. 1) the copy of the at least one file to determine the likelihood that the copy of the at least one file contains malicious and/or suspicious code. In some embodiments, step 220 includes comparing the likelihood that the file contains a suspicious code by comparing a correlation score between the copy of the file and a content of one or more confirmed malicious codes with a pre-determined threshold likelihood. In some embodiments, step 220 includes updating a library of malicious codes with the file when the likelihood that the file contains the suspicious code exceeds a pre-determined threshold.

At step 222, the process 200 may include, on at least a portion of the iterations, comparing (e.g., through the comparing module 126 of the system 100 of FIG. 1) the determined likelihood that the copy of the at least one file contains malicious and/or suspicious code to the stored report to determine whether there has been a change in the likelihood that the copy of the at least one file contains malicious and/or suspicious code.

Upon identifying that there has been a change in the likelihood that the copy of the at least one file contains malicious and/or suspicious code, at step 224, the process 200 may include, generating (e.g., through the report generating module 120 of the system 100 of FIG. 1) a second report containing the changed likelihood that the copy of the at least one file contains malicious and/or suspicious code. In some embodiments, step 224 includes removing the file from an electronic storage when the likelihood that the file contains the suspicious code exceeds a pre-determined threshold.

At step 226, the process 200 may include providing (e.g., through the report providing module 122 of the system 100 of FIG. 1) the generated second report to the customer of the software and/or data provider (e.g., a security-threat-identifying SaaS provider). In aspects, providing the generated second report to the customer of the security-threat-identifying SaaS provider may include causing the generated second report to display in association with a computing device of the customer of the security-threat-identifying SaaS provider.

Figure 3A:
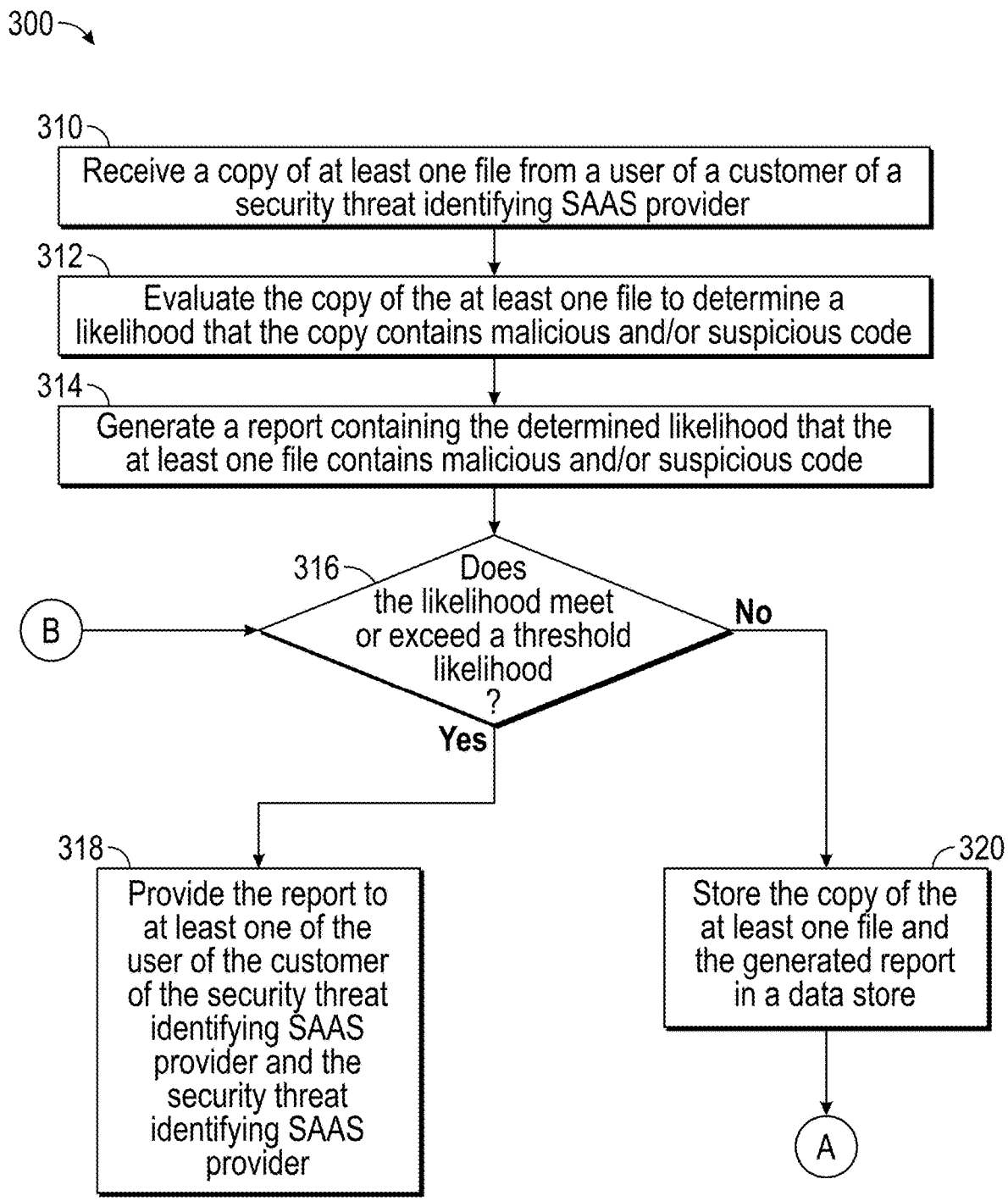
FIGS. 3A and 3B illustrate another exemplary flow diagram for evaluating files to determine a likelihood that one or more of the files contains malicious and/or suspicious code, in accordance with one or more implementations of the present disclosure.
Figure 3B:
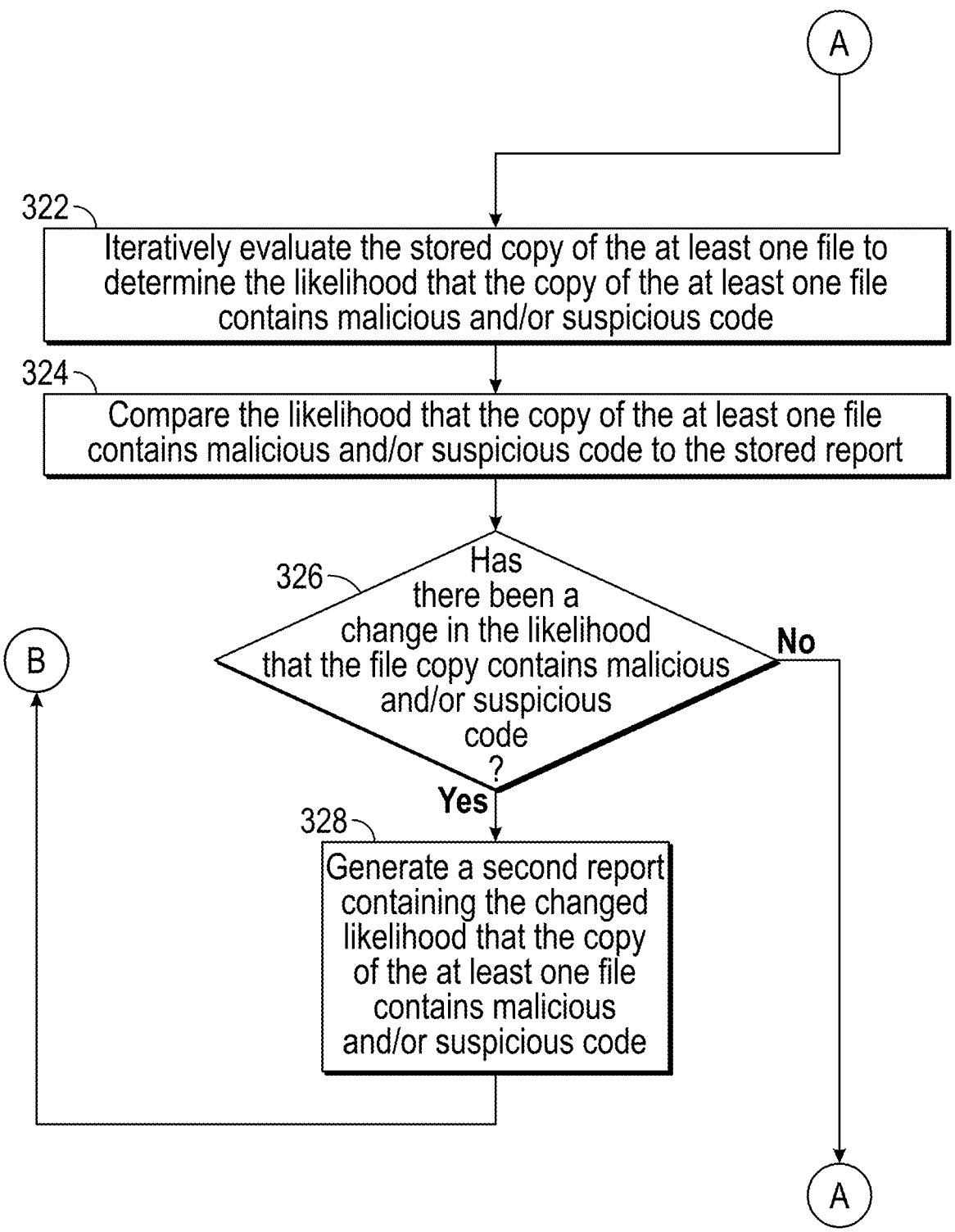

FIG. 3 illustrates an exemplary flow diagram (e.g., process 300) for evaluating files to determine a likelihood that one or more of the files contains malicious and/or suspicious code and, as such, poses at least a potential security threat, according to certain aspects of the disclosure. For explanatory purposes, the exemplary process 300 is described herein with reference to FIG. 1. Further for explanatory purposes, the steps of the exemplary process 300 are described herein as occurring in serial, or linearly. However, multiple instances of the example process 300 may occur in parallel.

At step 310, the process 300 may include receiving (e.g., through the file receiving module 116 of the system 100 of FIG. 1) a copy of at least one file from a user of a customer of a software and/or data provider (e.g., a security-threat-identifying SaaS provider). At step 312, the process 300 may include evaluating (e.g., through the file evaluating module 118 of the system 100 of FIG. 1) the copy of the at least one file to determine a likelihood that the copy of the at least one file contains malicious and/or suspicious code. At step 314, the process 300 may include generating (e.g., through the report generating module 120 of the system 100 of FIG. 1) a report containing the determined likelihood that the at least one file contains malicious and/or suspicious code. At step 316, the process 300 may include determining (e.g., through the file evaluating module 118 of the system 100 of FIG. 1) whether the determined likelihood that the copy of the at least one file contains malicious and/or suspicious code meets or exceeds a threshold likelihood.

If it is determined at step 316 that the likelihood that the copy of the at least one file contains malicious and/or suspicious code meets or exceeds the threshold likelihood, at step 318, the process 300 may include providing (e.g., through the report providing module 122 of the system 100 of FIG. 1) the generated report to at least one of the user of the customer of the security-threat-identifying SaaS provider and the customer of the security-threat-identifying SaaS provider. In aspects, providing the generated second report to at least one of the user of the customer of the security-threat-identifying SaaS provider and the customer of the security-threat-identifying SaaS provider may include causing the generated second report to display in association with a computing device of the customer of the security-threat-identifying SaaS provider.

If it is determined at step 316 that the threshold likelihood that the copy of the at least one file contains malicious and/or suspicious code has not been met or exceeded, at step 320, the process 300 may include storing (e.g., through the storage module 124 of the system 100 of FIG. 1) the copy of the at least one file and the generated report in a data store.

At step 322, the process 300 may include iteratively evaluating (e.g., through the file evaluating module 118 of the system 100 of FIG. 1) the stored copy of the at least one file to determine the likelihood that the copy of the at least one file contains malicious and/or suspicious code. At step 324, on at least a portion of the iterations, the process 300 may include comparing (e.g., through the comparing module 126 of the system 100 of FIG. 1) the determined likelihood that the copy of the at least one file contains malicious and/or suspicious code to the stored report. At step 326, the process 300 may include determining (e.g., through the comparing module 126 of the system 100 of FIG. 1) whether or not there has been a change in the likelihood that the copy of the at least one file contains malicious and/or suspicious code.

If it is determined at step 326 that there has been a change in the likelihood that the copy of the at least one file contains suspicious and/or malicious code, the process 300 may include, at step 328, generating (e.g., through the report generating module 120 of the system 100 of FIG. 1) a second report containing the changed likelihood that the copy of the at least one file contains malicious and/or suspicious code. The process 300 may then return to step 316 where the process 300 may include determining (e.g., through the file evaluating module 118 of the system 100 of FIG. 1) whether or not the changed likelihood that the copy of the at least one file contains suspicious and/or malicious code meets or exceeds the threshold likelihood.

If it is determined at step 316 that the changed likelihood that the copy of the at least one file contains malicious and/or suspicious code meets or exceeds the threshold likelihood, the process 300 may include, at step 318, providing (e.g., through the report providing module 122 of the system 100 of FIG. 1) the generated second report to at least one of the user of the customer of the software and/or data provider (e.g., a security-threat-identifying SaaS provider) and the customer of the security-threat-identifying SaaS provider. In aspects, providing the generated second report to at least one of the user of the customer of the security-threat-identifying SaaS provider and the customer of the security-threat-identifying SaaS provider may include causing the generated second report to display in association with a computing device of the customer of the security-threat-identifying SaaS provider.

If it is determined at step 316 that the changed likelihood that the copy of the at least one file contains suspicious and/or malicious code fails to meet or exceed the threshold likelihood, the process 300 may include, at step 320, storing (e.g., through the storage module 124 of the system 100 of FIG. 1) the copy of the at least one file and the generated second report in the data store.

Figure 4:
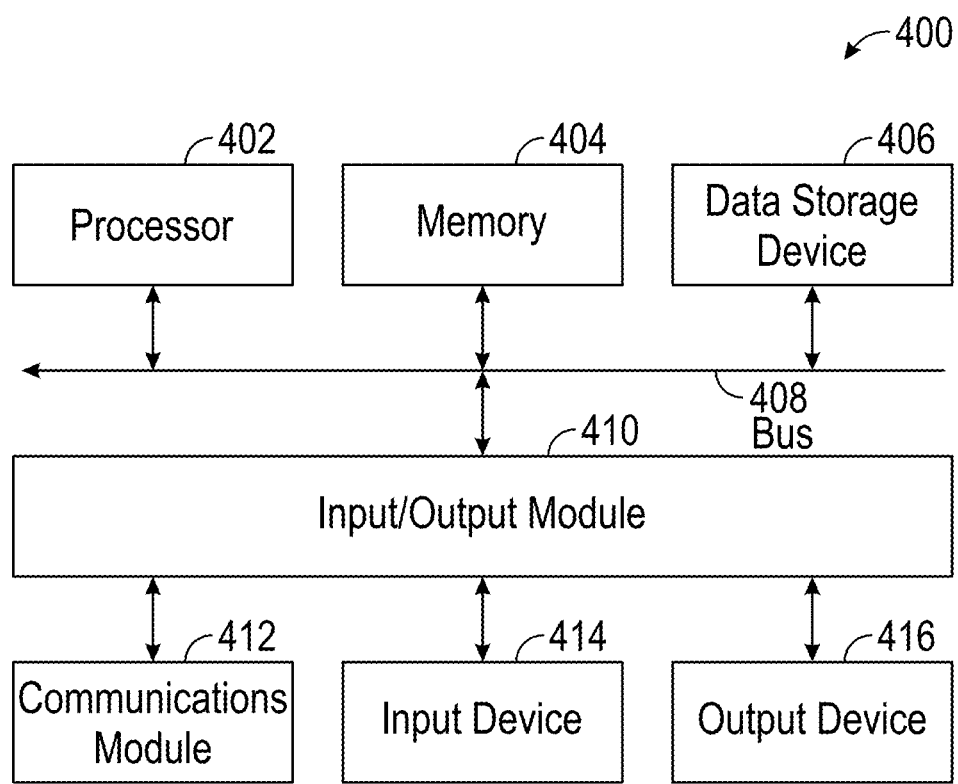
FIG. 4 is a block diagram illustrating an exemplary computer system (e.g., representing both client and server), with which aspects of the subject technology can be implemented.

With reference now to FIG. 4, illustrated is a block diagram showing an exemplary computer system 400 with which aspects of the subject technology can be implemented. In certain aspects, the computer system 400 may be implemented using hardware or a combination of software and hardware, either in a dedicated server, integrated into another entity, or distributed across multiple entities.

Computer system 400 (e.g., server and/or client) includes a bus 408 or other communication mechanism for communicating information, and a processor 402 coupled with bus 408 for processing information. By way of example, the computer system 400 may be implemented with one or more processors 402. Processor 402 may be a general-purpose microprocessor, a microcontroller, a Digital Signal Processor (DSP), an Application Specific Integrated Circuit (ASIC), a Field Programmable Gate Array (FPGA), a Programmable Logic Device (PLD), a controller, a state machine, gated logic, discrete hardware components, or any other suitable entity that can perform calculations or other manipulations of information.

Computer system 400 can include, in addition to hardware, code that creates an execution environment for the computer program in question, e.g., code that constitutes processor firmware, a protocol stack, a database management system, an operating system, or a combination of one or more of them stored in an included memory 404, such as a Random Access Memory (RAM), a flash memory, a Read Only Memory (ROM), a Programmable Read-Only Memory (PROM), an Erasable PROM (EPROM), registers, a hard disk, a removable disk, a CD-ROM, a DVD, or any other suitable storage device, coupled to bus 408 for storing information and instructions to be executed by processor 402. The processor 402 and the memory 404 can be supplemented by, or incorporated in, special purpose logic circuitry.

The instructions may be stored in the memory 404 and implemented in one or more computer program products, i.e., one or more modules of computer program instructions encoded on a computer readable medium for execution by, or to control the operation of, the computer system 400, and according to any method well-known to those of skill in the art, including, but not limited to, computer languages such as data-oriented languages (e.g., SQL, dBase), system languages (e.g., C, Objective-C, C++, Assembly), architectural languages (e.g., Java, .NET), and application languages (e.g., PHP, Ruby, Perl, Python). Instructions may also be implemented in computer languages such as array languages, aspect-oriented languages, assembly languages, authoring languages, command line interface languages, compiled languages, concurrent languages, curly-bracket languages, dataflow languages, data-structured languages, declarative languages, esoteric languages, extension languages, fourth-generation languages, functional languages, interactive mode languages, interpreted languages, iterative languages, list-based languages, little languages, logic-based languages, machine languages, macro languages, metaprogramming languages, multiparadigm languages, numerical analysis, non-English-based languages, object-oriented class-based languages, object-oriented prototype-based languages, off-side rule languages, procedural languages, reflective languages, rule-based languages, scripting languages, stack-based languages, synchronous languages, syntax handling languages, visual languages, wirth languages, and xml-based languages. Memory 404 may also be used for storing temporary variable or other intermediate information during execution of instructions to be executed by processor 402.

A computer program as discussed herein does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, subprograms, or portions of code). A computer program can be deployed to be executed on one computer or on multiple computers that are located at one site or distributed across multiple sites and interconnected by a communication network. The processes and logic flows described in this specification can be performed by one or more programmable processors executing one or more computer programs to perform functions by operating on input data and generating output.

Computer system 400 further includes a data storage device 406 such as a magnetic disk or optical disk, coupled to bus 408 for storing information and instructions. Computer system 400 may be coupled via input/output module 410 to various devices. The input/output module 410 can be any input/output module. Exemplary input/output modules 410 include data ports such as USB ports. The input/output module 410 is configured to connect to a communications module 412. Exemplary communications modules 412 include networking interface cards, such as Ethernet cards and modems. In certain aspects, the input/output module 410 is configured to connect to a plurality of devices, such as an input device 414 and/or an output device 416. Exemplary input devices 414 include a keyboard and a pointing device, e.g., a mouse or a trackball, by which a user can provide input to the computer system 400. Other kinds of input devices 414 can be used to provide for interaction with a user as well, such as a tactile input device, visual input device, audio input device, or brain-computer interface device. For example, feedback provided to the user can be any form of sensory feedback, e.g., visual feedback, auditory feedback, or tactile feedback, and input from the user can be received in any form, including acoustic, speech, tactile, or brain wave input. Exemplary output devices 416 include display devices such as an LCD (liquid crystal display) monitor, for displaying information to the user.

According to one aspect of the present disclosure, the above-described gaming systems can be implemented using a computer system 400 in response to processor 402 executing one or more sequences of one or more instructions contained in memory 404. Such instructions may be read into memory 404 from another machine-readable medium, such as data storage device 406. Execution of the sequences of instructions contained in the main memory 404 causes processor 402 to perform the process steps described herein. One or more processors in a multi-processing arrangement may also be employed to execute the sequences of instructions contained in memory 404. In alternative aspects, hard-wired circuitry may be used in place of or in combination with software instructions to implement various aspects of the present disclosure. Thus, aspects of the present disclosure are not limited to any specific combination of hardware circuitry and software.

Various aspects of the subject matter described in this specification can be implemented in a computing system that includes a back end component, e.g., such as a data server, or that includes a middleware component, e.g., an application server, or that includes a front end component, e.g., a client computer having a graphical user interface or a Web browser through which a user can interact with an implementation of the subject matter described in this specification, or any combination of one or more such back end, middleware, or front end components. The components of the system can be interconnected by any form or medium of digital data communication, e.g., a communication network. The communication network can include, for example, any one or more of a LAN, a WAN, the Internet, and the like. Further, the communication network can include, but is not limited to, for example, any one or more of the following network topologies, including a bus network, a star network, a ring network, a mesh network, a star-bus network, tree or hierarchical network, or the like. The communications modules can be, for example, modems or Ethernet cards.

Computer system 400 can include clients and servers. A client and server are generally remote from each other and typically interact through a communication network. The relationship of client and server arises by virtue of computer programs running on the respective computers and having a client-server relationship to each other. Computer system 400 can be, for example, and without limitation, a desktop computer, laptop computer, or tablet computer. Computer system 400 can also be embedded in another device, for example, and without limitation, a mobile telephone, a PDA, a mobile audio player, a Global Positioning System (GPS) receiver, a video game console, and/or a television set top box.

The term "machine-readable storage medium" or "computer readable medium" as used herein refers to any medium or media that participates in providing instructions to processor 402 for execution. Such a medium may take many forms, including, but not limited to, non-volatile media, volatile media, and transmission media. Non-volatile media include, for example, optical or magnetic disks, such as data storage device 406. Volatile media include dynamic memory, such as memory 404. Transmission media include coaxial cables, copper wire, and fiber optics, including the wires that comprise bus 408. Common forms of machine-readable media include, for example, floppy disk, a flexible disk, hard disk, magnetic tape, any other magnetic medium, a CD-ROM, DVD, any other optical medium, punch cards, paper tape, any other physical medium with patterns of holes, a RAM, a PROM, an EPROM, a FLASH EPROM, any other memory chip or cartridge, or any other medium from which a computer can read. The machine-readable storage medium can be a machine-readable storage device, a machine-readable storage substrate, a memory device, a composition of matter effecting a machine-readable propagated signal, or a combination of one or more of them.

The technology is illustrated, for example, according to various aspects described below. Various examples of aspects of the subject technology are described as numbered clauses (clause 1, 2, etc.) for convenience. These are provided as examples and do not limit the subject technology.

Clause 1: A computer-implemented method for evaluating files to determine a likelihood that one or more of the files contains malicious and/or suspicious code and, as such, poses at least a potential security threat. The method includes receiving a copy of at least one file from a customer of a security-threat-identifying software-as-a-service ("SaaS") provider. The method includes evaluating the copy of the at least one file to determine a likelihood that the copy of the at least one file contains malicious and/or suspicious code. The method includes generating a report containing the determined likelihood that the at least one file contains malicious and/or suspicious code. The method includes providing the generated report to the customer of the security-threat-identifying SaaS provider. The method includes storing the copy of the at least one file and the generated report in a data store. The method includes iteratively evaluating the copy of the at least one file to determine the likelihood that the copy of the at least one file contains malicious and/or suspicious code. The method includes, on at least a portion of the iterations, comparing the determined likelihood that the copy of the at least one file contains malicious and/or suspicious code to the stored report to determine whether there has been a change in the likelihood that the copy of the at least one file contains malicious and/or suspicious code. The method includes, upon identifying that there has been a change in the likelihood that the copy of the at least one file contains malicious and/or suspicious code, generating a second report containing the changed likelihood that the copy of the at least one file contains malicious and/or suspicious code. The method includes providing the generated second report to the customer of the security-threat-identifying SaaS provider.

Clause 2: A system configured for evaluating files to determine a likelihood that one or more of the files contains malicious and/or suspicious code and, as such, poses at least a potential security threat. The system includes one or more hardware processors configured by machine-readable instructions. The processor(s) are configured to receive a copy of at least one file from a user of a customer of a security-threat-identifying software-as-a-service ("SaaS") provider. The processor(s) are configured to evaluate the copy of the at least one file to determine a likelihood that the copy of the at least one file contains malicious and/or suspicious code. The processor(s) are configured to generate a report containing the determined likelihood that the at least one file contains malicious and/or suspicious code. The processor(s) are configured to determine whether the determined likelihood that the copy of the at least one file contains malicious and/or suspicious code meets or exceeds a threshold likelihood. If it is determined that the likelihood that the copy of the at least one file contains malicious and/or suspicious code meets or exceeds a threshold likelihood, the processor(s) are configured to provide the generated report to the at least one of the user of the customer of the security-threat-identifying SaaS provider and the customer of the—security-threat-identifying SaaS provider. If it is determined that the threshold likelihood that the copy of the at least one file contains malicious and/or suspicious code has not been met or exceeded, the processor(s) are configured to store the copy of the at least one file and the generated report in a data store. The processor(s) are configured to iteratively evaluate the stored copy of the at least one file to determine the likelihood that the copy of the at least one file contains malicious and/or suspicious code. The processor(s) are configured to, on at least a portion of the iterations, compare the determined likelihood that the copy of the at least one file contains malicious and/or suspicious code to the stored report to determine whether there has been a change in the likelihood that the copy of the at least one file contains malicious and/or suspicious code. Upon determining that there has been a change in the likelihood that the copy of the at least one file contains malicious and/or suspicious code, the processor(s) are configured to generate a second report containing the changed likelihood that the copy of the at least one file contains malicious and/or suspicious code. The processor(s) are configured to determine whether the changed likelihood that the copy of the at least one file contains malicious and/or suspicious code meets or exceeds the threshold likelihood. If it is determined that the changed likelihood that the copy of the at least one file contains malicious and/or suspicious code meets or exceeds the threshold likelihood, the processor(s) are configured to provide the generated second report to at least one of the user of the customer of the security-threat-identifying SaaS provider and the customer of the security-threat-identifying SaaS provider.

As used herein, the phrase "at least one of" preceding a series of items, with the terms "and" or "or" to separate any of the items, modifies the list as a whole, rather than each member of the list (i.e., each item). The phrase "at least one of" does not require selection of at least one item; rather, the phrase allows a meaning that includes at least one of any one of the items, and/or at least one of any combination of the items, and/or at least one of each of the items. By way of example, the phrases "at least one of A, B, and C" or "at least one of A, B, or C" each refer to only A, only B, or only C; any combination of A, B, and C; and/or at least one of each of A, B, and C.

To the extent that the terms "include", "have", or the like is used in the description or the claims, such term is intended to be inclusive in a manner similar to the term "comprise" as "comprise" is interpreted when employed as a transitional word in a claim. The word "exemplary" is used herein to mean "serving as an example, instance, or illustration". Any embodiment described herein as "exemplary" is not necessarily to be construed as preferred or advantageous over other embodiments.

A reference to an element in the singular is not intended to mean "one and only one" unless specifically stated, but rather "one or more". All structural and functional equivalents to the elements of the various configurations described throughout this disclosure that are known or later come to be known to those of ordinary skill in the art are expressly incorporated herein by reference and intended to be encompassed by the subject technology. Moreover, nothing disclosed herein is intended to be dedicated to the public regardless of whether such disclosure is explicitly recited in the above description.

While this specification contains many specifics, these should not be construed as limitations on the scope of what may be claimed, but rather as descriptions of particular implementations of the subject matter. Certain features that are described in this specification in the context of separate embodiments can also be implemented in combination in a single embodiment. Conversely, various features that are described in the context of a single embodiment can also be implemented in multiple embodiments separately or in any suitable sub-combination. Moreover, although features may be described above as acting in certain combinations and even initially claimed as such, one or more features from a claimed combination can in some cases be excised from the combination, and the claimed combination may be directed to a sub-combination or variation of a sub-combination.

The subject matter of this specification has been described in terms of particular aspects, but other aspects can be implemented and are within the scope of the present disclosure. For example, while operations are depicted in the drawings in a particular order, this should not be understood as requiring that such operations be performed in the particular order shown or in sequential order, or that all illustrated operations be performed to achieve desirable results. The actions recited herein can be performed in a different order and still achieve desirable results. As one example, the processes depicted in the accompanying figures do not necessarily require the particular order shown, or sequential order, to achieve desirable results. In certain circumstances, multitasking and parallel processing may be advantageous. Moreover, the separation of various system components in the aspects described above should not be understood as requiring such separation in all aspects, and it should be understood that the described program components and systems can generally be integrated together in a single software product or packaged into multiple software products. Other variations are within the scope of the present disclosure.

What is claimed is:

1. A computer-implemented method, comprising:
   receiving a copy of a file from a customer of a software and/or data provider;
   evaluating the copy of the file to determine a likelihood that the copy of the file contains a malicious code;
   generating a report containing the likelihood that the file contains a malicious code;
   providing the report to the customer of the software and/or data provider;
   storing the copy of the file and the report in a data store;
   performing iterative evaluations, based on existing file copies and reports in the data store, of the copy of the file to determine the likelihood that the file contains a malicious code;
   determining, in one or more of the iterative evaluations, there has been a change in the likelihood that the copy of the file contains a malicious code based on at least the report and new information associated with contents of one or more files and reports included in the data store in one or more of the iterative evaluations;
   in response to the change in the likelihood that the file contains the malicious code, generating a second report containing the likelihood that the file contains the malicious code; and
   providing the second report to the customer of the software and/or data provider.

2. The computer-implemented method of claim 1, wherein evaluating the copy of the file comprises matching the copy of the file with a known sequence found in a computer virus.

3. The computer-implemented method of claim 1, wherein evaluating the copy of the file comprises accessing a library including a known malicious code, and determining a similarity between the copy of the file and the known malicious code.

4. The computer-implemented method of claim 1, wherein evaluating the copy of the file comprises matching the copy of the file with at least one rule in the software and/or data provider that has been successfully used to identify a confirmed malicious code.

5. The computer-implemented method of claim 1, wherein evaluating the copy of the file comprises identifying a pattern from a confirmed malicious code in the copy of the file.

6. The computer-implemented method of claim 1, wherein evaluating the copy of the file comprises correlating the copy of the file with a content of one or more confirmed malicious codes.

7. The computer-implemented method of claim 1, further comprising updating a rule in the software and/or data provider when the file is confirmed to include a malicious code.

8. The computer-implemented method of claim 1, wherein comparing the likelihood that the file contains a malicious code comprises comparing a correlation score between the copy of the file and a content of one or more confirmed malicious codes with a pre-determined threshold likelihood.

9. The computer-implemented method of claim 1, further comprising updating a library of malicious codes with the file when the likelihood that the file contains the malicious code exceeds a pre-determined threshold.

10. The computer-implemented method of claim 1, further comprising removing the file from an electronic storage when the likelihood that the file contains the malicious code exceeds a pre-determined threshold.

11. A system, comprising:
    one or more processors configured by machine-readable instructions to:
      receive a copy of a file from a customer of a software and/or data provider;
      evaluate the copy of the file to determine a likelihood that the copy of the file contains malicious code;
      generate a report containing the likelihood that the file contains a malicious code;
      provide the report to the customer of the software and/or data provider;
      store the copy of the file and the report in a data store;
      perform iterative evaluations, based on all existing file copies and reports in the data store, of the copy of the file to determine the likelihood that the file contains a malicious code;
      determine, in one or more of the iterative evaluations, there has been a change in the likelihood that the copy of the file contains a malicious code based on at least the report and new information associated with contents of one or more files and reports included in the data store in one or more of the iterative evaluations;
      in response to the change in the likelihood that the file contains the malicious code, generate a second report containing the likelihood that the file contains the malicious code; and
      provide the second report to the customer of the software and/or data provider.

12. The system of claim 11, wherein to evaluate the copy of the file the one or more processors are configured to match the copy of the file with a known sequence found in a computer virus.

13. The system of claim 11, wherein to evaluate the copy of the file the one or more processors are configured to access a library including a known malicious code, and to determine a similarity between the copy of the file and the known malicious code.

14. The system of claim 11, wherein to evaluate the copy of the file the one or more processors are configured to match the copy of the file with at least one rule in the software and/or data provider that has been successfully used to identify a confirmed malicious code.

15. The system of claim 11, wherein the one or more processors are configured to update a rule in the software and/or data provider when the file is confirmed to include a malicious code.

16. A non-transitory computer-readable storage medium with multiple instructions embodied thereon, wherein the instructions are executable by one or more processors to perform a method, comprising:
    receiving a copy of a file from a customer of a software and/or data provider;
    evaluating the copy of the file to determine a likelihood that the copy of the file contains malicious code;
    generating a report containing the likelihood that the file contains a malicious code;

providing the report to the customer of the software and/or data provider;

storing the copy of the file and the report in a data store;

performing iterative evaluations, based on all existing file copies and reports in the data store of the copy of the file to determine the likelihood that the file contains a malicious code;

determining, in one or more of the iterative evaluations, there has been a change in the likelihood that the file contains a malicious code based on at least the report and new information associated with contents of one or more files and reports included in the data store in one or more of the iterative evaluations;

in response to the change in the likelihood that the file contains the malicious code, generating a second report containing the likelihood that the file contains the malicious code; and providing the second report to the customer of the software and/or data provider.

17. The non-transitory computer-readable storage medium of claim 16, wherein the instructions are executable by the one or more processors for matching the copy of the file with a known sequence found in a computer virus to evaluate the copy of the file.

18. The non-transitory computer-readable storage medium of claim 16, wherein the instructions are executable by the one or more processors for accessing a library including a known malicious code, and determining a similarity between the copy of the file and the known malicious code.

19. The non-transitory computer-readable storage medium of claim 16, wherein the instructions are executable by the one or more processors for matching the copy of the file with at least one rule in the software and/or data provider that has been successfully used to identify a confirmed malicious code.

20. The non-transitory computer-readable storage medium of claim 16, wherein the instructions are executable by the one or more processors for updating a rule in the software and/or data provider when the file is confirmed to include a malicious code.

* * * * *